United States Patent
Mayhew

(10) Patent No.: US 6,734,900 B2
(45) Date of Patent: May 11, 2004

(54) REAL TIME CAMERA AND LENS CONTROL SYSTEM FOR IMAGE DEPTH OF FIELD MANIPULATION

(76) Inventor: Christopher Mayhew, 1155 Herndon Pkwy., Suite 200, Herndon, VA (US) 22070

(*) Notice: Subject to any disclaimer, the term of this patent is extended or adjusted under 35 U.S.C. 154(b) by 0 days.

(21) Appl. No.: 09/189,852

(22) Filed: Nov. 12, 1998

(65) Prior Publication Data

US 2003/0164893 A1 Sep. 4, 2003

Related U.S. Application Data

(60) Provisional application No. 60/065,220, filed on Nov. 13, 1997.

(51) Int. Cl.$^7$ ................................................ H04N 5/225
(52) U.S. Cl. .................. 348/207.11; 348/239; 348/362; 348/363; 348/368
(58) Field of Search ................................ 348/239, 362, 348/368, 207.11, 207.1, 221.1, 229.1, 363

(56) References Cited

U.S. PATENT DOCUMENTS

| | | | | |
|---|---|---|---|---|
| 4,532,553 A | * | 7/1985 | Brill | 348/364 |
| 4,934,824 A | * | 6/1990 | Ling | 352/213 |
| 5,051,770 A | * | 9/1991 | Cornuejols | 396/125 |
| 5,092,670 A | * | 3/1992 | Preston | 352/140 |
| 5,245,379 A | * | 9/1993 | Azuma et al. | 396/299 |
| 5,528,334 A | * | 6/1996 | Lee | 396/257 |
| 5,610,654 A | * | 3/1997 | Parulski et al. | 348/229.1 |
| 5,621,495 A | * | 4/1997 | Yamamoto et al. | 396/290 |
| 5,721,981 A | * | 2/1998 | Kosaka et al. | 396/130 |
| 5,861,917 A | * | 1/1999 | Tariki et al. | 348/230.1 |
| 5,892,991 A | * | 4/1999 | Hamada et al. | 396/147 |
| 5,912,774 A | * | 6/1999 | Yoshida et al. | 359/823 |
| 5,999,215 A | * | 12/1999 | Tamura | 348/224.1 |
| 6,028,981 A | * | 2/2000 | Hirasawa et al. | 386/117 |

* cited by examiner

Primary Examiner—Andrew Christensen
Assistant Examiner—Eric Wisdahl
(74) Attorney, Agent, or Firm—Finnegan, Henderson, Farabow, Garrett & Dunner, L.L.P.

(57) ABSTRACT

A method is provided for real time control and manipulation of a moving imaging system lens's (prime, close-up, zoom, or anamorphic) depth of field. A computer control system is programed to perform a coordinated adjustment of a closed loop lens iris (aperture) and the shutter angle of a motion picture camera. The iris of the lens is reduced in size while simultaneously increasing the motion picture camera shutter angle an equal exposure (light transmission) amount, therefore, increasing the apparent image depth of field without a perceivable luminance shift. The image depth of field can be reduced by performing the above operation in reverse.

14 Claims, 3 Drawing Sheets

LENS AND CAMERA CONTROL

REAL TIME CAMERA AND LENS CONTROL SYSTEM FOR IMAGE DEPTH OF FIELD MANIPULATION

This application claims the benefit of U.S. Provisional Application No. 60/065,220, filed Nov. 13, 1997.

FIELD OF THE INVENTION

This invention relates to optical systems for creating moving images using motion pictures or video recording means. It is more closely related to computer control systems that provide real time adjustment of the lens and camera function settings.

BACKGROUND OF THE INVENTION

The first camera was the camera obscura. It consisted of a light-tight box with a pin hole in one side. The later part of the Nineteenth Century saw the invention of flexible photographic film by George Eastman and a workable motion picture camera/projection system by Thomas Edison's New Jersey laboratories. On Dec. 28, 1895, the Lumieres brothers held the first public screening of Cinematographic films at the Grand Cafe, Boulevard des Capucines, Paris, and the "movies" were born.

Motion picture lenses provide a cinematographer with four basic optical variables with which to compose a given scene. These are focus, iris (aperture), filtration and change in focal length. Mostly, the lens is used simply as a conduit to pass light to film. Over the years lens mechanics and optics have improved, but for all intents and purposes, a lens today and its role in motion photography is the same as it was 100 years ago.

While modern motion pictures cameras operate on the same basic principles as those used by the Lumieres brothers, they differ in the recent use of computer control to allow for software driven adjustment of camera functions such as camera shooting speed and the camera shutter angle.

Contemporary motion picture cameras provide for shutter angle adjustment to control the image exposure. The amount of shutter opening adjustment varies among camera manufactures and may range as high as 220° of angular change. This degree of shutter angle adjustment could theoretically provide as much as 5 f/stops of exposure change. In practical applications, however, a very small shutter angle creates a strobing effect in moving subjects and, therefore, limits the exposure compensation to perhaps 3 f/stops.

Shutter angle adjustment is typically used when a cinematographer desires to slow the camera shooting speed down without varying the lens iris (f/or T stop) to compensate for the exposure change by modifying the image exposure time of the motion picture camera. Unlike a still camera, most modern motion picture cameras employ a spinning mirrored shutter system to provide for film exposure and reflex viewing. The reflective shutter is typically located at a 45° angle in front of the film plane. Since standard motion pictures are filmed at 24 frames per second (fps), the way to adjust the image exposure time and maintain a constant shooting speed is by changing the size of the opening in the shutter. The smaller the opening (angle) the shorter the exposure time for each image and vise versa.

Motion picture camera systems have been developed which provide for an automatic shutter angle adjustment to compensate for exposure changes due to a camera shooting speed change. For example, if a cinematographer is shooting a scene at 24 fps with 180° shutter angle, and he wishes to increase the speed of a subject's motion by 100% during the shot without a visible exposure change, the shooting speed would be ramp down to 12 fps, while simultaneously reducing the shutter angle to 90°. This 90° shutter angle reduction is equivalent to one full f/stop or 50% of the original exposure.

As the camera shooting speed is slowed down, the exposure time is increased because the shutter is not turning as fast, and therefore, its angle must be reduced to compensate for the increase in light. Images shot at 12 fps and displayed at the standard 24 fps projection speed will exhibit a 100% increase in subject movement speed. The exposure time of 12 fps is twice as long as 24 fps and therefore requires a shutter angle reduction of 50% to compensate for the increased exposure.

One method of providing for the compensation in shutter angle size in accordance with a change in exposure time is to control the camera via a remote computer. Exemplary cameras that operate in response to commands from such a computer include the Arriflex 35 mm 435 and 535A and 16 mm series motion picture 16SR3 cameras. This type of camera provides for the remote control of camera functions through the use of camera control software protocol via a computer interface. The camera and computer are also able to exchange data via the computer interface.

The computer control sends messages to the camera and the camera responds to those messages. The computer control can send two types of messages: a command to perform a certain task and a request for information on tasks or other functions. The camera in turn will either perform the commanded task, provide the requested information or issue a warning message that the commanded task cannot be performed. The communications protocol consists of messages to perform tasks and returned acknowledge or not acknowledge messages. The message format can be a string of characters with a defined format and meaning.

The advent of the moving optical element lens for image parallax scanning as described in U.S. Pat. No. 5,448,322 to Bacs, which is hereby expressly incorporated herein by reference, has now made possible the interlocking of coordinated settings changes of the lens iris and camera shutter angle. The moving optical element lens iris is controlled by a series of closed-loop actuators. The iris center can be positioned anywhere inside the lens's full effective aperture, frame-by frame. In addition, the iris can be scanned while a given frame is being exposed (as in 11 go motion" in animation).

More commonly, a scan path of a particular size is set and the iris follows this path continuously while the camera runs. The scan path is usually a circle around the center (the nominal Z axis) of the lens. The diameter of this path can be increased or decreased on the fly while a given scene is being recorded. The shape of the path can also be modified on the fly, for example, from a perfect circle to an ellipse. In addition to the scan path, the scan frequency, focus position and f-stop can also be adjusted on the fly via remote control. The f-stop is inversely related to the diameter of the entrance pupil (N=F/D, wherein N is the f-stop, F is the focal length of the lens, and D is the diameter of the aperture).

Another variable in optical photography is depth of field, which is explained by Rudolf Kingslake in his 1992 book *Optics in Photography*. As explained by Kingslake, if a camera is focused on an object at some definite distance from the camera's imaging plane, there will be a finite range of distances in front of and beyond the focused object in which everything will appear acceptably in focus. Outside that range everything becomes more blurred at increasing distances from the plane of best focus. "The actual extent of this range of acceptably sharp definition depends mainly on the distance of the subject from the lens, the aperture [size] of the lens, and the manner in which we look at the final print, but it also depends to some extent on the type of subject being photographed, the resolving power of the film and paper emulsions, and the aberrations of the camera lens."

While the camera systems and methods described above are useful in allowing in-shot camera shooting speed changes they do not provide for a coordinated computer control of both camera shutter angle and lens iris settings in order to manipulate image depth of field.

SUMMARY OF THE INVENTION

Systems and methods consistent with the present invention provide depth of field fade capabilities in moving imaging systems through synchronized operation of the optical elements of a camera system.

To attain the advantages and in accordance with the purpose of the invention, as embodied and broadly described herein, the motion picture system of the present invention includes a computer controller, a computer controlled lens, a computer controlled aperture, and a computer controlled adjustable shutter having a shutter angle, wherein the operation of the aperture, the shutter, and the lens are synchronized by the controller to produce a depth of field fade without a visible luminance shift in a film exposed by the camera.

Further, to attain the advantages and in accordance with the purpose of the invention, as embodied and broadly described herein, the method of producing a depth of field fade in a moving imaging system without a visible luminance shift in accordance with the present invention includes the steps of: adjusting the object distance of the lens to change the depth of field of the camera; adjusting the aperture size to change the depth of field of said camera; and adjusting the exposure time to compensate for said aperture adjustment; wherein the aperture adjustment and exposure adjustment are synchronized to avoid a visible luminance shift in images produces by the camera.

The following detailed description of the invention refers to the accompanying drawings. The following detailed description does not limit the invention. Instead the scope of the invention is defined by the appended claims.

BRIEF DESCRIPTION OF THE DRAWINGS

The accompanying drawings, which are incorporated in and constitute a part of this specification, illustrate preferred embodiments of the invention, and, together with the description, explain the goals, advantages and principles of the invention. In the drawings.

DESCRIPTION OF THE PREFERRED EMBODIMENTS

Figure 1:
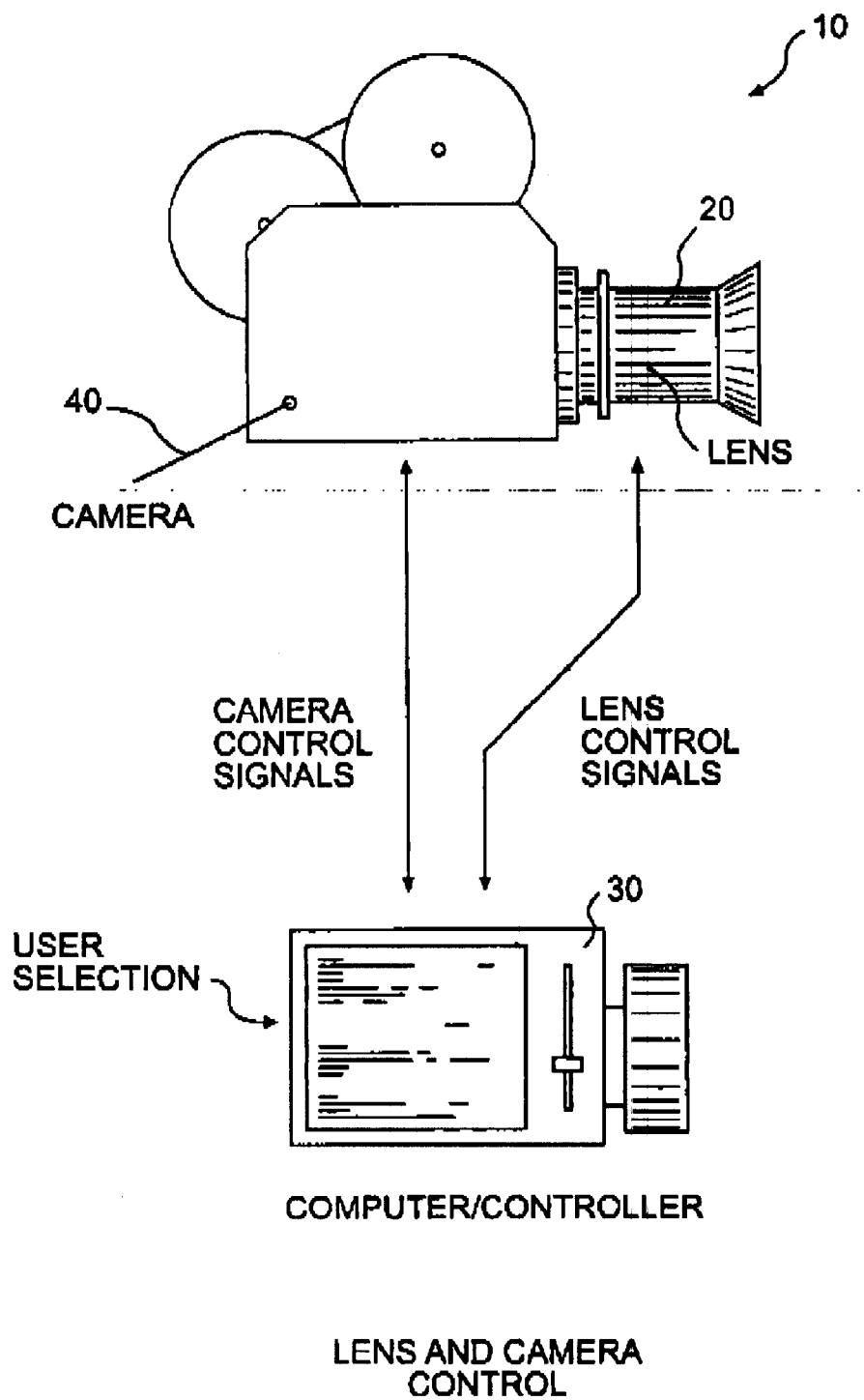
FIG. 1 is a block diagram of the proposed control system.

As discussed in the Background section, the moving optical element lens provides a number of variables that can be independently adjusted to produce changes in the resulting filmed images. Two features of interest that are utilized in the embodiments described below are remote control of focus position and f/stop adjustment. These two features can be adjusted individually or together to produce a depth of field fade.

In order to determine the depth of field for a camera arrangement, it is first necessary to determine a variable of the lens called the hyperfocal distance. The hyperfocal distance is defined as the distance to the closest point that will be acceptably in focus when the lens is focused at infinity. The lens is focused at infinity when the distance between the rear principal point of the lens (a characteristic distance value of the lens that depends on the index of refraction of the lens) and the film distance is equal to the focal length of the lens.

It is also necessary to determine a value of acceptable focus in order to determine both hyperfocal distance and depth of field. When light from a single subject point passes through the lens of a camera, the light is focused as a cone of light onto the surface of the film. The point is perfectly in focus when the focused light that forms the cone converges at the film. When the point is out of focus, the cone of light will intersect the film either before or after the point of convergence, thereby forming a circle rather than a point on the film. This circle of light is called the circle of confusion. Cc is defined as the largest acceptable circle of confusion. This value is given a specific value, but is in fact subjective, and depends on the perceptions of the viewer of the produced image. One set of industry standard acceptable values for the largest circle of confusion Cc are 0.001 inches for 35 mm film, and 0.006 inches for 16 mm film.

The formula for hyperfocal distance using inches or fractions thereof is:

$$H = \frac{F^2}{N \times C_C} \quad (1)$$

where F is the focal length of the lens, N is the f/stop number, and Cc is the circle of confusion. The hyperfocal distance, therefore, is inversely proportional to the f/stop number, which itself is inversely proportional to D, the diameter of the entrance pupil. A change in the aperture of the entrance pupil, therefore, has a direct relationship to a change in the hyperfocal distance.

The two values of the depth of field are then calculated utilizing the value of the hyperfocal distance from equation (1) above. When rendering an image of an object at an object distance S from the camera, there is both a closest alternative point that is acceptably in focus, and a farthest alternative point that is acceptably in focus. The area within which a point will be imaged within acceptable focus is the depth of field, and is bounded at both extremes by the point at which the image of a point would create a circle greater than the defined accepted circle of confusion value.

The near limit of the range of acceptable focus is found using the equation:

$$DN \text{ camera to near limit} = \frac{H \times S}{H + (S - F)} \quad (2)$$

The far limit of the range of acceptable focus is found using the equation:

$$DF \text{ camera to far limit} = \frac{H \times S}{H - (S - F)} \quad (3)$$

The depth total is then calculated using the following equation:

$$\text{Depth Total} = DF - DN \quad (4)$$

As shown by the above equations, there are two variables of interest in the calculation of the depth of field. The first variable is the hyperfocal distance. As mentioned above, by changing the diameter of the aperture, the hyperfocal distance is changed. For example, changing the f/stop from f/2 to f/4 would result in halving the hyperfocal distance. Using the changed value of the hyperfocal distance in the equations for near and far limit of depth of field above, it is shown that the near and far limits of the depth of field are also changed.

Consequent to the change in f/stop is a resultant change in the amount of light that is incident on the film. The amplitude of the illumination at the film is directly proportional to the area of the aperture (i.e. for a circular aperture the area is proportional to the radius squared). This means that by halving the area of the aperture, the level of illumination striking the film is also halved.

In order to provide a depth of field fade without a resulting change in the level of illumination, the time duration of the exposure of the film must be changed to compensate for the change in the aperture size. This could be accomplished, for example, by doubling the time of exposure for each frame of film for each halving of the area of the aperture. In motion picture cameras, this change in the exposure time is accomplished by changing the shutter angle (i.e. a doubling of the shutter angle is equal to a doubling of the exposure time). Therefore, for each change in the area of the aperture, a reciprocal change in the shutter angle is provided. When these are controlled to change in a synchronized indirect relationship, the system will produce a depth of field fade without a visible change in luminance.

A first preferred embodiment of the invention is shown in FIG. 1, which shows a camera system 10. Camera system 10 include computer/controller 30 coupled to camera 40 having lens 20. The functions of the camera and the camera lens are controlled by the operation of the computer/controller.

Figure 2:
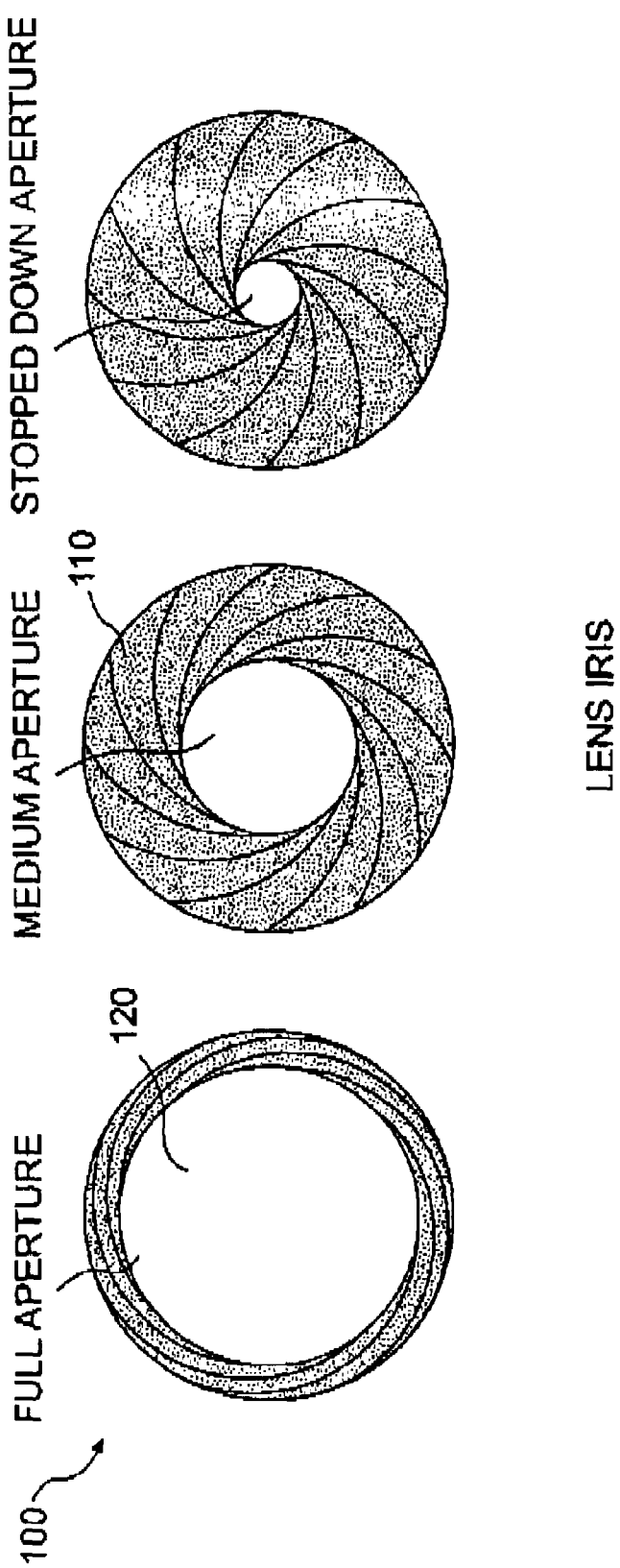
FIG. 2 is the front view of a lens iris.

FIG. 2 shows an exemplary aperture 100 for use in the camera of FIG. 1. Aperture 100 includes a plurality of aperture elements 110, which together form iris 120. As stated above, for circular apertures, the diameter of the aperture is related to the f/stop of the camera, and thereby, the hyperfocal distance and the depth of field of the image produced by the camera. The size of aperture 100 is actively controlled by computer/controller 30, which is able to change the size of iris 120 of aperture 100 via a command control signal produced by computer/controller 30. Computer/controller 30 is also able to choose the speed at which the change in iris size is accomplished.

Figure 3:
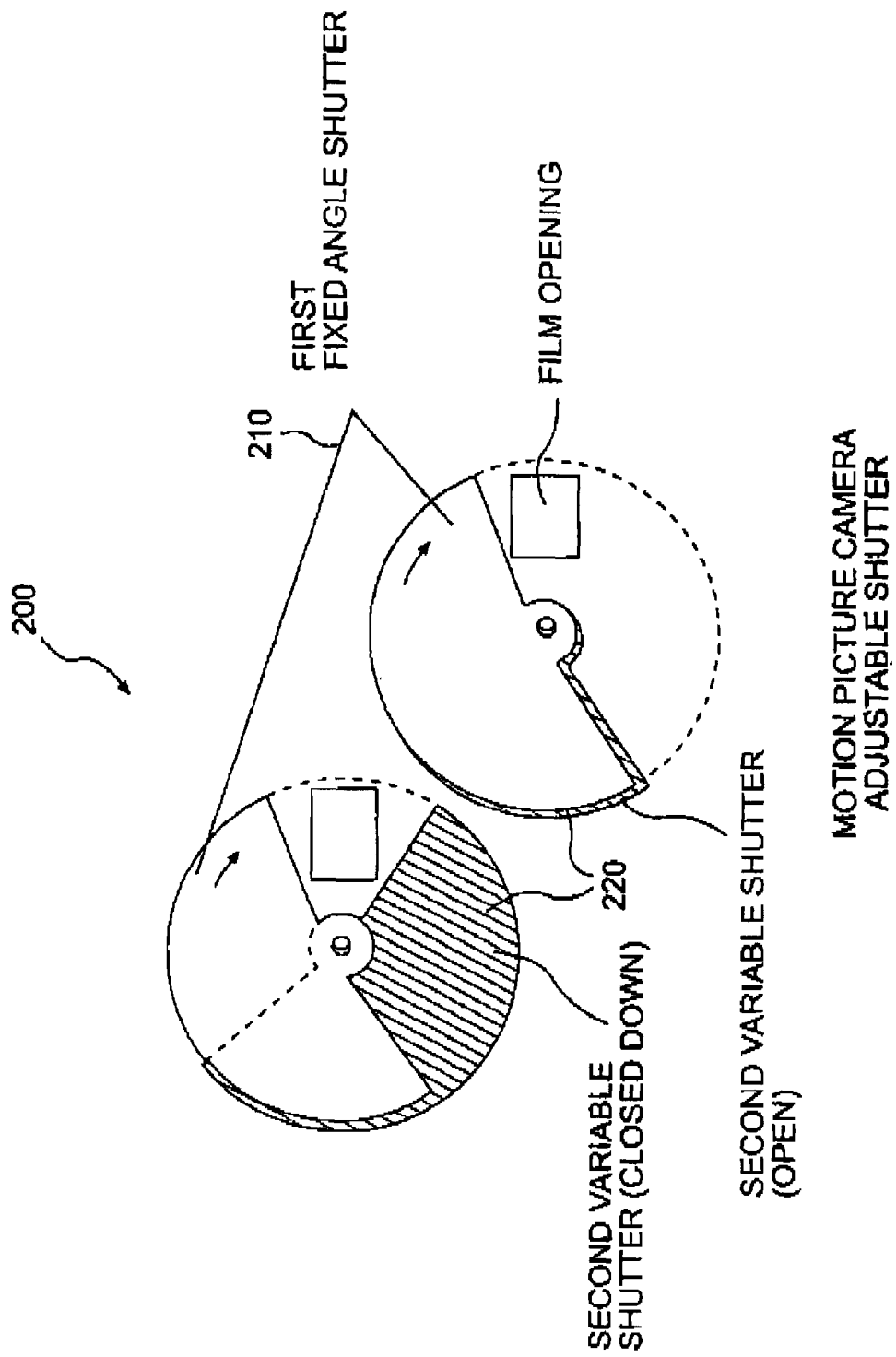
FIG. 3 is the front view a motion picture adjustable shutter.

FIG. 3 shows an exemplary adjustable shutter 200 for use with a motion picture camera, as shown in FIG. 1. The adjustable shutter includes two shutters, first fixed angle shutter 210 and second variable shutter 220. The angle between first fixed angle shutter 210 and second variable shutter 220 (i.e. the remaining portion of the circle not occluded by either shutter) is the shutter angle. As shutter 200 rotates, the amount of illumination striking the film is controlled by setting the shutter angle of adjustable shutter 200. The setting of adjustable shutter 200 is controlled by computer/controller 30.

A user of camera system 10 can produce a depth of field fade by inputting a signal via an interface to computer/controller 30. Computer/controller 30 outputs a first signal to aperture 100 in accordance with the desired change in depth of field.

Concurrently with the change in the setting of aperture 100, computer/controller 30 outputs a second signal to adjustable shutter 200. The amount of change in the shutter angle of adjustable shutter 200 is used to compensate for the difference in illumination striking the film as a result of the change in the area of iris 120.

It is also desirable to be able to produce the depth of field fade in a controlled variable speed manner. The operator of the camera system might want to bring far elements, near elements or both into focus in a relatively rapid or slow manner. In the production of films, different optical effects would necessitate the use of variable speeds for different depth of field fades. By using the same computer control for both the aperture 100 and adjustable shutter 200, the user can operate both elements together at any desirable speed to produce the desired effect.

An exemplary description of the operation of the computer/controller 30 follows. Upon receipt of a change request from the camera system user, the computer initiates the following exemplary steps of a depth of field fade. The change request from the user includes both a change in the f/stop value and a time duration for the system to produce the depth of field fade. A third value necessary to the production of the requested change is the update time rate of computer/controller 30. This is a variable rate that determines how often computer/controller 30 produces a signal to update the settings of the variables under its control.

Upon receipt of the request, computer/controller 30 interrogates camera 40 and lens 20 to determine the currents settings of the f/stop and shutter angle. Computer/controller then calculates the total change in f/stop necessary to produce the required f/stop. Following the calculation of the total change in the f/stop value, a calculation of the total change in shutter angle is performed in accordance with the change in the f/stop.

By dividing the time duration of the change by its update time rate, computer/controller 30 then determines the number of steps necessary to produce the total change in f/stop and shutter angle. The total changes in aperture area and shutter angle are then divided by the number of steps, the resulting numbers being the required change in f/stop and shutter angle per update step. These values are then converted to the proper signal form to produce the required change in aperture 100 and adjustable shutter 200. Computer/controller 30 then outputs a sequence of value change signals to both aperture 100 and adjustable shutter 200 to produce the required changes in the f/stop and shutter angle.

A second embodiment of the invention is disclosed again with reference to FIG. 1. As with changing depth of field by altering the hyperfocal distance, it is also possible to alter the depth of field by altering the object distance S, as shown by the near depth of field equation (2) and far depth of field equation (3). The following is the thin lens equation:

$$\frac{1}{S} + \frac{1}{S'} = \frac{1}{F}; \text{where} \tag{5}$$

S is the distance between the front principle point of the lens and the plane of focus, F is the focal length of the lens, and S' is the distance between the rear principle point of the lens and the plane of the film. Referring again to the discussion above with respect to near and far depth of field, it is possible to change the plane of focus of the lens without perceptibly changing whether the object will appear in focus. The object will appear in focus until the amount of blur exceeds the circle of confusion as defined above, though again this is a subjective value. The image distance S', therefore, can be changed, resulting in a change in the object distance S. As long as the object itself remains within the near and far limits of the depth of focus the object will be acceptably in focus. (The change in object distance can also be accomplished by altering the focal length of the lens).

As shown in FIG. 1, computer/controller 30 is connected to camera 40. Computer/controller 30 produces lens control signals, which alter the distance between lens 20 and the film in camera 40. By altering the distance between lens 20 and the film, the camera is able to change the object distance S. As shown by the two depth of field equations (2 and 3), changes in the object distance will result in a change in the depth of field.

By constructively altering both the f/stop of the aperture and the object distance S, the system can further increase its ability to alter the area within the depth of focus. Because computer/controller 30 is able to control the operation of both lens 20 and aperture 100, the system can synchronously alter both elements together in order to produce a greater range of depth of field. Due to the coordinated control of these elements the system can produce a relatively slow optical effect by slowly altering the optical elements separately or together. It is therefore possible to bring a broad range of elements into and out of focus at a selected speed without producing a visible luminance change in the resulting pictures. A viewer of the resulting images, could therefore, watch as elements within the field of the camera enter or leave focus during a single continuous shot, without a noticeable change in the brightness of the resulting image.

An example of the operation of the second embodiment of the invention follows. If the correct exposure of a given scene is f/16 and the subject is located 11 ft from the camera image plane, a depth of field fade can be accomplished by an opposed reversal using a 50 mm lens focused at 10 ft with an iris setting of f/4 on a camera with shutter angle setting of 11°. As the computer control increases the shutter angle to 180°, it also decreases the lens iris to f/16 at an identical exposure (light transmission) rate and moves the lens focus position from 10 ft to 20 ft. The resulting moving image would start with a range of depth of field from 8'11" to 11'5" (2'6" of the image in focus), and finish with a depth of field from 9' to infinity. This change in depth of field would be accomplished without a visible change in exposure. Of course the reverse is also possible. A cinematographer can therefore start a shot with a subject in shallow focus and slowly (or quickly) bring the background into focus while keeping the subject in focus with no visible image exposure changes. This technique, along with the other image enhancements of the invention, has tremendous creative applications.

A third embodiment of the present invention will now be described with respect to the operation of a video camera. Both the operation of the aperture 100 and lens 20 are identical to that described above with respect to both the first and second embodiments.

Unlike motion picture cameras, video cameras do not operate using a adjustable shutter having a shutter angle. Instead, video cameras include various electronic controlled "shutters" that produce a selected time duration of light exposure of the charge coupled elements (CCDs) in the camera. One example of the a light sensitive CCD element is called the Interline Transfer Chip. The central processing unit of the camera produces a timing signal that determines the rate at which the rows of charge coupled elements are interrogated. The time between interrogations of the individual charge coupled elements is the exposure time of the element to the incident light. Analogous, therefore, to the change in shutter angle change for a motion picture camera is the length of time between consecutive interrogations of the charge coupled elements of a video camera. By changing the time of exposure of the charge coupled elements to the incident light in accordance with changes in the area of the aperture, a depth of field fade can be accomplished in a video camera without a visible shift in luminance.

It will be apparent to those skilled in the art that various modifications and variations can be made in the methods and apparatus consistent with the present invention without departing from the scope or spirit of the invention. Other modifications will be apparent to those skilled in the art from consideration of the specification and practice of the invention disclosed herein. The specification and examples should be considered as exemplary only, with the true scope and spirit of the invention being indicated by the following claims.

I claim:

1. A motion picture system, including a motion picture camera, said system comprising:
   a computer controller;
   a computer controlled aperture; and
   a computer controlled shutter having an adjustable shutter angle;
   wherein said aperture and said shutter are automatically controlled by said computer controller to produce a depth of field fade, over a user selected time duration, without a visible luminance shift in a film exposed by said camera.

2. The system of claim 1, wherein as said controller causes a change in the area of said aperture, said controller causes a synchronized inverse change in said shutter angle.

3. The system of claim 1, wherein said aperture and said shutter are automatically adjusted at a selectable update rate.

4. A method of producing a depth of field fade in a moving imaging system without a visible luminance shift comprising the steps of:
   adjusting an aperture size of a moving imaging camera to change a depth of field of an image recorded by said camera; and
   adjusting an exposure time of said camera to compensate for a change in illumination due to said aperture adjustment;
   wherein said aperture adjustment and said exposure adjustment are synchronized and automatically performed by a computer controller over a user selected time duration to avoid a visible luminance shift in images produced by said camera.

5. The method of claim 4, wherein said camera is a motion picture camera.

6. The method of claim 4, wherein said camera is a video camera.

7. The method of claim 4, wherein said aperture adjustment and said exposure adjustment are automatically performed by the computer controller at a selectable update rate.

8. A motion picture system, including a motion picture camera, said system comprising:
   a computer controller;
   a computer controlled lens;
   a computer controlled aperture; and
   a computer controlled shutter having an adjustable shutter angle;
   wherein the operation of said aperture, said shutter, and said lens are synchronized and automatically controlled by said computer controller over a user selected time duration to produce a depth of field fade without a visible luminance shift in a film exposed by said camera.

9. A method of producing a depth of field fade in a moving imaging system without a visible luminance shift comprising the steps of:
- adjusting the focus distance of a lens to change a depth of field of an image recorded by a camera;
- adjusting an aperture size to change said depth of field; and
- adjusting an exposure time to compensate for said aperture adjustment;
- wherein said aperture adjustment and said exposure adjustment are synchronized and automatically controlled over a user selected time duration to avoid a visible luminance shift in images recorded by said camera.

10. The method of claim 9, wherein said camera is a motion picture camera.

11. The method of claim 9, wherein said camera is a video camera.

12. The method of claim 9, wherein said aperture adjustment and said exposure adjustment are automatically performed by the computer controller at a selectable update rate.

13. A video system, including a video camera, said system comprising:
- a computer controller;
- a computer controlled aperture; and
- a computer controlled electronic shutter;
- wherein said aperture and said shutter are automatically controlled by said computer controller to produce a depth of field fade, over a user selected time duration, without a visible luminance shift in video images produced by said camera.

14. A video system, including a video camera, said system comprising:
- a computer controller;
- a computer controlled lens;
- a computer controlled aperture; and
- a computer controlled electronic shutter;
- wherein the operation of said aperture, said shutter, and said lens are synchronized and automatically performed by said controller to produce a depth of field fade, over a user selected time duration, without a visible luminance shift in video images produced by said camera.

* * * * *